Dec. 19, 1933.   G. H. HARTMAN   1,939,978
SHOCK ABSORBER FOR LUBRICATING APPARATUS
Filed Sept. 14, 1931   2 Sheets-Sheet 1
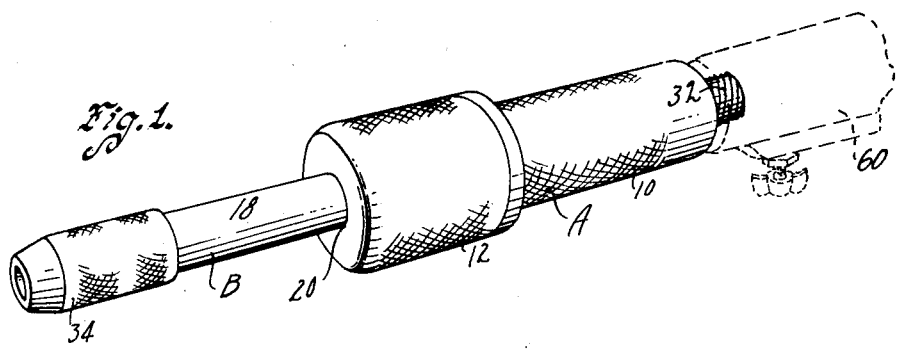
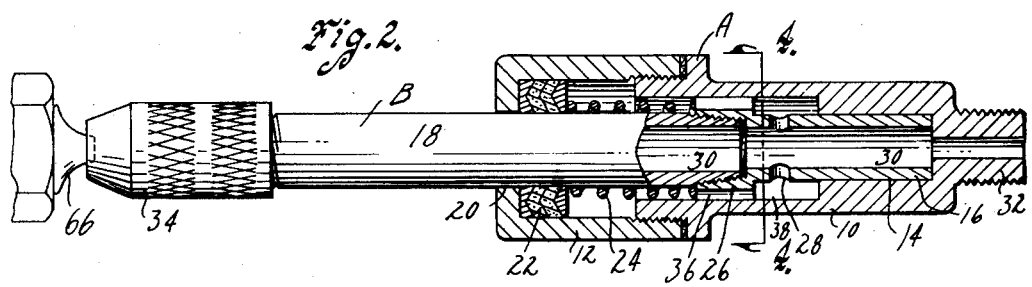
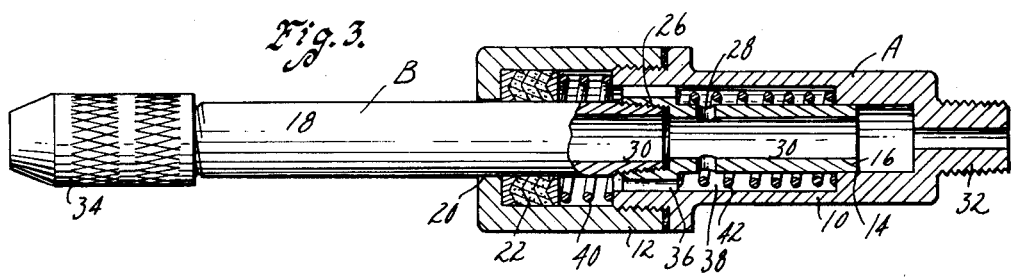
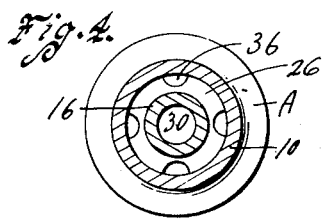

Dec. 19, 1933. G. H. HARTMAN 1,939,978
SHOCK ABSORBER FOR LUBRICATING APPARATUS
Filed Sept. 14, 1931 2 Sheets-Sheet 2
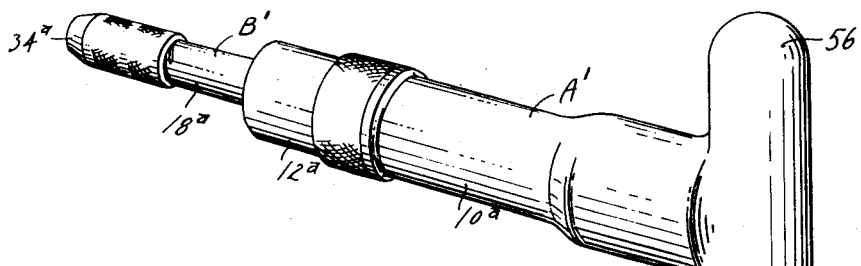
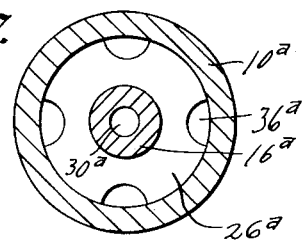
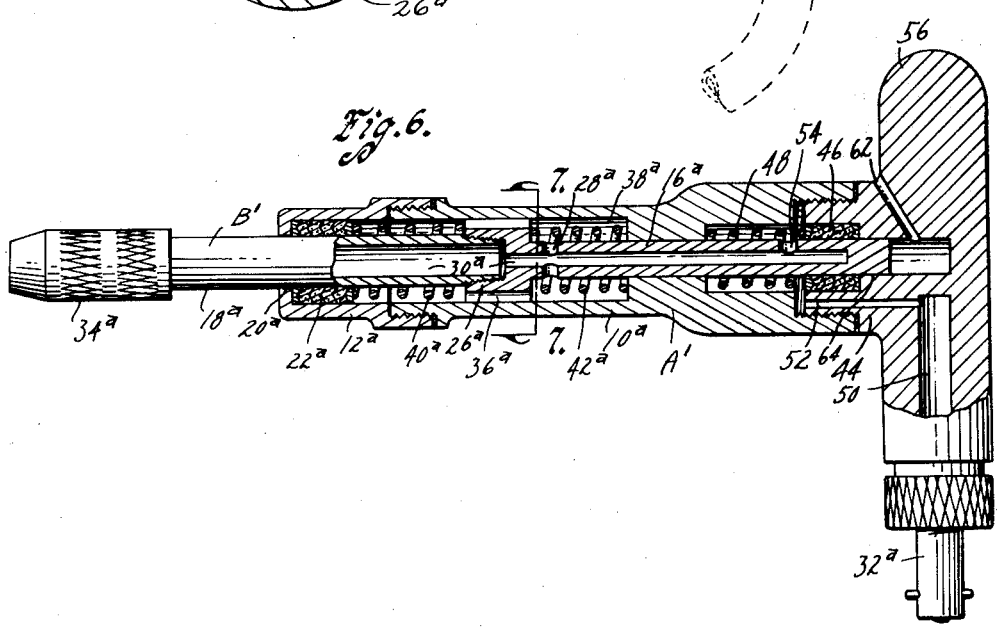

Patented Dec. 19, 1933

1,939,978

UNITED STATES PATENT OFFICE 1,939,978

SHOCK ABSORBER FOR LUBRICATING APPARATUS

George H. Hartman, Bryan, Ohio, assignor to The Aro Equipment Corporation, Bryan, Ohio, a corporation of Ohio Application September 14, 1931
Serial No. 562,733

8 Claims. (Cl. 221—47.4)

An object of my present invention is to provide a shock absorber for use in connection with lubricating apparatus, whereby to absorb the shocks caused on the arms of an operator when using a vibrating type of high pressure lubricant supply apparatus on a contact type of lubricant fitting.

A further object is to provide a shock absorber comprising a pair of parts movable relative to each other between which the lubricant under pressure may be interposed for eliminating an entire metal to metal contact between the vibrating lubricant supply mechanism and the rigidly mounted contact type of lubricant fitting.

Still a further object is to provide resilient means for causing the parts to assume a predetermined position when not in use.

More particularly, it is my object to provide a shock absorber consisting of a casing and a plunger movable relative to each other and adapted to be extended by lubricant pressure introduced into the shock absorber, whereby shocks on the lubricating apparatus caused by vibration of the lubricant pressure generating mechanism may be absorbed by the lubricant under pressure itself when the parts are held in a "floating" position relative to each other.

A further object is to provide a cylinder-like casing with a plunger extensible therefrom with means for introducing the lubricant under pressure into the casing and expelling it from a lubricant fitting engager on the outer end of the plunger.

A further object is to provide the plunger extending entirely through the casing and packed relative to the ends thereof, the plunger itself being formed in two sections of different diameters.

With these and other objects in view, my invention consists in the construction, arrangement and combination of the various parts of my shock absorber for lubricating apparatus, whereby the objects contemplated are attained, as hereinafter more fully set forth, pointed out in my claims, and illustrated in the accompanying drawings, in which:

Figure 1 is a perspective view of one form of my shock absorber for lubricating apparatus showing a type adaptable for connection with the discharge nozzle of a lubricant gun.

Figure 2 is a longitudinal view partially in section of the shock absorber shown in Figure 1.

Figure 3 is a sectional view of a shock absorber somewhat similar to Figure 2, but having a modified internal arrangement.

Figure 4 is a sectional view on the line 4—4 of Figure 2.

Figure 5 is a perspective view of another modified form of construction.

Figure 6 is a sectional view of the shock absorber shown in Figure 5; and

Figure 7 is a sectional view on the line 7—7 of Figure 6.

In the accompanying drawings, I have used the reference character A to indicate generally a casing and B a plunger reciprocable relative thereto. The casing A is formed of two portions 10 and 12 screw-threaded together as shown in Figure 2.

The portion 10 is provided with a bore 14 in which the plunger B is reciprocably mounted. The portion of the plunger in the bore 14 is indicated by the reference numeral 16. Another portion 18 thereof extends through an opening 20 in the head of the portion 12 of the casing A. The portion 18 of the plunger B is packed relative to the portion 12 of the casing A as indicated at 22. The packing 22 is retained in tight position by a spring 24. The spring 24 also engages a shoulder portion 26 formed on the portion 16 of the plunger B for the purpose of normally causing the parts to assume the position shown in Figure 2.

Openings 28 are provided for free passage of lubricant under pressure from a bore 30 of the plunger B which communicates at one end with a plug 32 of the casing A and at its other end with a lubricant fitting engager 34.

The shoulder portion 26 is provided with grooves 36 for passage of lubricant under pressure past the shoulder portion which is slidably mounted in an enlarged bore 38 of the portion 10.

In Figure 3 instead of using a spring 24, I provide a spring 40 for the purpose of tightening the packing 22 only, and I provide a spring 42 within the bore 38 and on the opposite side of the shoulder portion 26 to normally cause outward movement of the extension of the plunger B relative to the casing A. In this form of construction the parts which are similar to the form shown in Figure 2 are given the same reference numerals in Figure 6.

I have shown still another modified form of construction shown in Figures 5 and 7 in which the parts are given similar reference numerals with the addition of the distinguishing characteristic "a" and the casing and plunger are indicated as A' and B'. This construction differs from that shown in Figures 2 and 3 in that the portion 16a of the plunger B' extends completely through the right end 44 of the portion 10a of the casing A'. The portion 44 is screw-threaded into the portion 10a and the plunger portion 16a is packed relative thereto by means of packing 46 and a spring 48.

The plunger portions 16a and 18a are of different diameters. It is obvious that if they were the same diameter a balanced condition would occur and consequently lubricant under pressure within the shock absorber would not extend the plunger as in Figures 2 and 3. The variation in the sizes of the plunger portions may be predetermined depending upon requirements.

In Figure 6, I have shown springs 40a and 42a counterbalancing each other, whereby to normally place the plunger B' in an intermediate position relative to the casing A'.

Lubricant under pressure is supplied to a bayonet or similar type of fitting 32a and passes through passageways 50 and 52 and then through a port 54 into a bore 30a of the plunger B'.

In this type of device, a handle portion 56 facilitates use of the tool when connected with the flexible hose connection 58 of a lubricant pressure generator.

In Figure 1, I have shown a lubricant gun 60, such as of the pneumatic hammer type shown in the reissue patent to Chapman, Reissue No. 17,974, dated February 17, 1931. A vent opening 62 is provided to prevent pocketing of the air in a bore 64 of the handle 56 into which the plunger portion 16a extends.

*Practical operation*

Ordinarily in the operation of the lubricating apparatus of the kind where an intermittent pump or hammer gun operated by compressed air is used and the lubricant is supplied to a contact type of lubricant fitting, such as a Zerk fitting 66, shown in Figure 2, the sudden hammerings caused by the pressure makes it difficult to hold the lubricant fitting engager 34 in position without the operator experiencing considerable shock to his hands. The devices shown in my drawings are provided for absorbing this shock.

In the type of device shown in Figure 2, the shock absorber is held in position against the fitting 66 and the gun is turned on. The operator then allows the casing A to work back slightly as the lubricant pressure tends to extend the plunger B from the casing A. This will eliminate the metal to metal contact at the inner end of the plunger 16 and the lubricant will to a great extent absorb the shock which would otherwise be experienced.

Upon removal of the shock absorber from the fitting, the spring 24 brings the parts to the initial position shown in Figure 2. In Figure 3, the initial position is reversed. The spring 42 is shown fully expanded. At the beginning of a greasing operation, the operator pushes on the lubricant gun to compress the spring 42 to some extent, so that the engager 34 will be held by the spring tension against the fitting 66.

Thereafter the lubricant under pressure flows into the casing A behind the plunger B and with the plunger held in a "floating" position by bringing proper pressure to bear on the casing A, the lubricant under pressure will absorb the shock.

In Figure 6, the shock absorber may be connected with the flexible hose and connector 58 extending to a lubricant gun, and the shock absorber only is held against the lubricant fitting 66.

The plunger and casing are already in floating positions relative to each other, because of the counteraction of the springs 40a and 42a. It is then merely necessary for the operator to apply the best pressure for maximum shock absorption.

A device of the character disclosed eliminates the rigidity of lubricating apparatus, wherein a metal connector is held directly against a lubricant fitting and provides for the lubricant under pressure passing through the device to absorb the shock ordinarily experienced by such a rigid connection.

Some changes may be made in the arrangement and construction of the parts of my shock absorber for lubricating apparatus, without departing from the real spirit and purpose of my invention, and it is my intention to cover by my claims, any modified forms of structure or use of mechanical equivalents, which may be reasonably included within their scope.

I claim as my invention:

1. In a shock absorber for lubricating apparatus, a casing adapted to receive lubricant under pressure, a plunger reciprocable therein, extending therethrough and packed relative to each end thereof, said plunger, between the packings, having a transition shoulder from small diameter to large diameter, a lubricant fitting engager on one end of said plunger, and means of communication between the interior of said casing and said lubricant fitting engager.

2. In a shock absorber for lubricating apparatus, a casing adapted to receive lubricant under pressure from an external source of supply, a plunger therein and reciprocable by the lubricant under pressure therein, extending therethrough and packed relative to the ends thereof, said plunger having ends of different diameters, a lubricant fitting engager on the end of said plunger having the largest diameter, means of communication between the interior of said casing and said lubricant fitting engager and resilient means to normally retract said members relative to each other upon release of the lubricant pressure causing extension thereof.

3. In a device of the class described, a casing member and a plunger member relatively movable and adapted to be extended relative to each other by lubricant under pressure, one of said members having a lubricant fitting engager adapted to receive lubricant under pressure for supplying such lubricant to a lubricant fitting, and a pair of resilient means counterbalancing each other to normally cause said members to assume a non-extended position upon release of the lubricant pressure.

4. In a device of the class described, a casing member and a plunger member relatively movable and adapted to be extended relative to each other by lubricant under pressure, said plunger member having its ends extending through the ends of said casing member and packed relative thereto, one of said members having a lubricant fitting engager adapted to receive lubricant under pressure for supplying such lubricant to a lubricant fitting.

5. In a device of the class described, a casing member and a plunger member relatively movable and adapted to be extended relative to each other by lubricant under pressure directly from an external source of supply, said plunger member having ends of different diameters extending through and packed relative to the ends of said casing member, one of said members having a lubricant fitting engager adapted to receive lubricant under pressure for supplying such lubricant to a lubricant fitting and the other serving as a seal within its packing between the interior of said casing and atmosphere.

6. In a device of the class described, a casing, a plunger reciprocable relative thereto, the reciprocation thereof being limited, a shoulder on said plunger within said casing, resilient means within said casing engaging said shoulder to cause said plunger to normally assume a position intermediate the limits of its reciprocation, and means for connecting said casing with a source of lubricant under pressure for interposing such lubricant between said casing and said plunger to extend the plunger from the casing.

7. In a device of the class described, a casing, a plunger reciprocable relative thereto and having a limited stroke, resilient means for causing said plunger to normally assume an intermediate position relative to its stroke limits, and means for connecting said casing with a source of lubricant under pressure for interposing such lubricant between said casing and said plunger to extend the plunger from the casing.

8. In a device of the class described, a casing member and a plunger member relatively movable and adapted to be extended relative to each other by lubricant under pressure, one of said members being limited in its path of movement relative to the other one, one of said members having a lubricant fitting engager adapted to receive lubricant under pressure for supplying such lubricant to a lubricant fitting, and resilient means to cause said casing member and said plunger member to normally assume an intermediate position relative to its limited path of movement.

GEORGE H. HARTMAN.